Nov. 28, 1967  L. J. PERPER  3,355,736
CROSS CORRELATION DIRECTION FINDER
Filed June 23, 1965  3 Sheets-Sheet 1
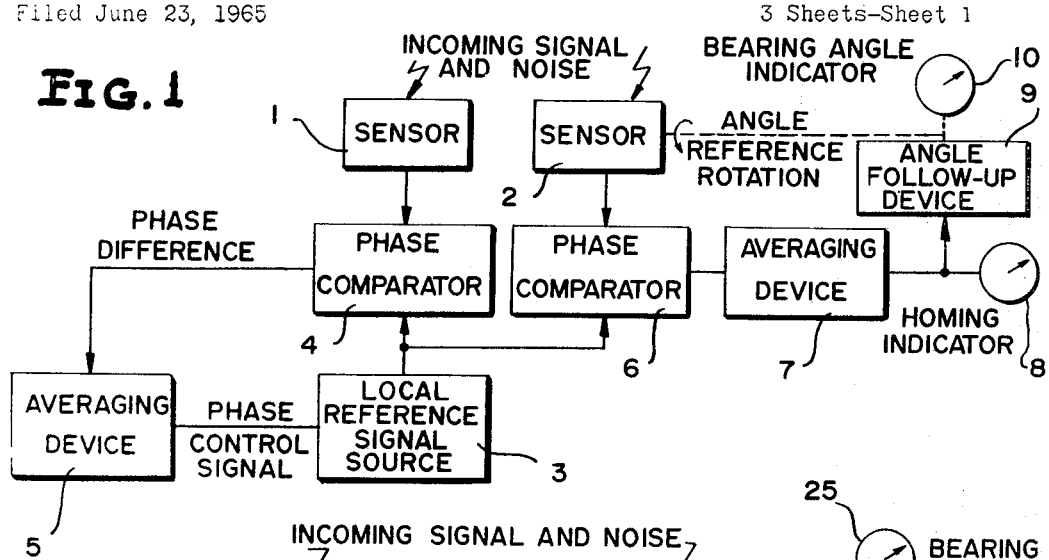
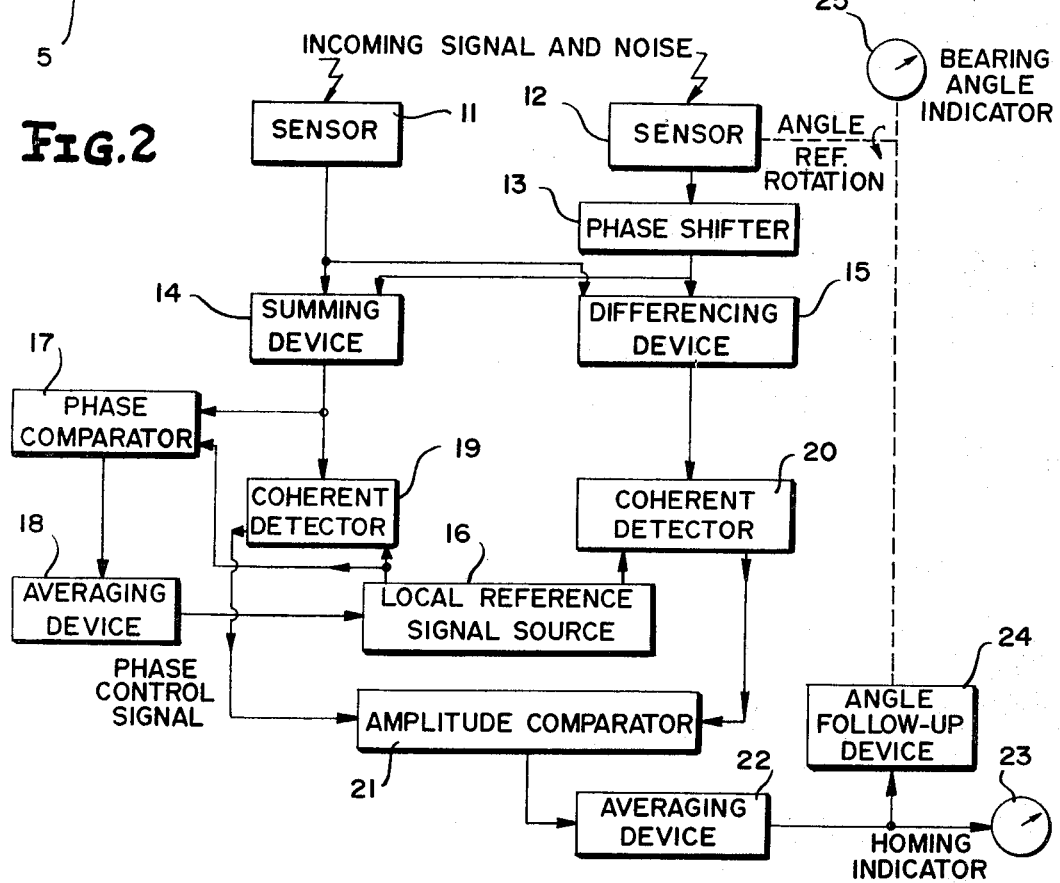
INVENTOR
LLOYD J. PERPER
BY Hurvitz & Rose
ATTORNEYS

3,355,736
Patented Nov. 28, 1967

3,355,736
CROSS CORRELATION DIRECTION FINDER
Lloyd J. Perper, 3725 Ironwood Hill Drive,
Pima, Ariz. 85543
Filed June 23, 1965, Ser. No. 466,250
21 Claims. (Cl. 343—113)

ABSTRACT OF THE DISCLOSURE

Automatic direction finding is achieved by use of a pair of sensing devices, such as antennas, of different directive characteristics for producing signals of representative phase and amplitude in response to incoming electromagnetic waves in the presence of noise, locking the phase of a locally generated reference signal to signal developed from at least one of the signals deriving from the antennas, cross-correlating the local reference signal with the received signal to generate another signal representative of instantaneous bearing angle error which is utilized to indicate the direction of arrival of the desired incoming waves. Long time averaging in the phase lock and error signal loops, relative to mean length of noise bursts, tends to cancel out the randomly phased signals and spurious perturbations picked up by the antennas along with desired signal.

---

This invention relates to an improved type of direction finder using correlation techniques, with the capability of operation in high noise levels, and while in motion.

In determining the direction of arrival of electromagnetic waves, conventional directional direction finders are not well suited to operation in high noise levels. At high noise-to-signal ratios, the noise products generated in the detection process become large compared with signal products, and performance deteriorates markedly.

Also conventional direction finders are inherently sensitive to waves arriving at angles far removed from the direction of the signal of interest; it is ordinarily relatively easy for the indicated bearing to be pulled away from the correct angle by interfering signals, thunderstorm static, and other undesired waves from other angles.

It is an object of this invention to provide manual and/or automatic direction finding with the capability of operation in a near-optimum manner in very low signal-to-noise ratios.

It is a further object to discriminate against signals whose contents differ from that of the desired signal.

It is a further object to use a type of control logic in which the average effects of incoherent signals or noise produce no bias in the output indications.

It is a further object to discriminate against waves whose angles of arrival differ from the angle of arrival of the desired signal by amounts or rates in excess of expected values.

It is a further object to weight the control information according to the credibility of the received signals.

It is a further object to weight communication information according to instantaneous angle of reception to discriminate against energy received from extraneous angles.

It is a further object to apply external attitude and navigation angle information from components such as gyros and dead reckoners when available, to reduce the error-producing effects of translation and rotation of the direction-finding sensor elements relative to the source of received waves.

The cross-correlation direction finder differs from the conventional art in that the detection process is based on the cross-correlation of a locally produced signal with the received energy, rather than envelope detection, autocorrelation of the received energy, or correlation in terms of impressed modulation on the received signal, as for instance by a spinning antenna. The advantages of direct cross-correlation detection at low signal-to-noise ratios are known in the present art, as used for instance in phase-lock detection of signals from space vehicles.

The limitation exists that loss of phase-lock in the locally produced signal tends to introduce system errors. In this invention, the bearing angle error produced thereby tends to depend on average phase error. This principle is turned to advantage in discriminating against noise and incoherent signals, whose phases are random with respect to the phase of the locally produced signal. The locally produced signal is locked in phase relative to the desired signal to be received, using stable time bases and long averaging time in the correction loop so that disturbances of the nature of bursts of static or heterodyning signals will not unlock the phase; the averaging time may representatively be in the range between one second and one minute, and may be maximized by compensating for predictable perturbations such as directive effects as functions of bearing angle, or Doppler effect as a function of speed relative to the source of radiation. If a noise burst is received, comprised of randomly-phased components, the averaged angle-changing effects are self-canceling in this invention, tending toward zero with increasing time; in the conventional art, noise bursts introduce non-canceling bearing errors.

Compensation for Doppler effect as a function of speed relative to the source of radiation may be achieved by deriving actual or approximate values of Doppler frequency shift from the external (to the direction finding system) navigational data for the vehicle in which the direction finding apparatus is mounted, and adding a rate having a value corresponding to the rate of such frequency shift to the generated local reference signal, so as to cancel or substantially cancel the erroneous effect of relative speed between vehicle and radiation source, during cross-correlation of local signal with received energy. Alternatively, the Doppler frequency shift values may be subtracted from the outputs of the radiation sensors employed in the direction finding system, or by otherwise removing such predictable Doppler shifts from the difference between the received signal phases and the phase of the local reference signal.

In this invention, the received signal may consist of continuous waves or complex waves of arbitrary form. A local signal is generated which is identical with all or part of the desired signal to be received. The received energy is cross-correlated with the local signal, and an error signal is derived whose averaged value is caused to lock the time base or phase of the local signal to that of the desired signal. If noise or a signal of differing frequency or differing phase structure is received, the correlation direction finder will be relatively insensitive to it as compared with input of the form and phase of the desired signal.

In this invention, account is taken of the fact that the bearing of a source of radiation is not likely to change instantaneously or by more than a given amount in a specified interval; any excess beyond these values may be presumed to be due to noise rather than signal, and provision is made for reducing the proportionate contributions of such data to the control signals. The weighting functions used for this purpose may be of more than a single type, depending on whether the system has been preset in angle or is tracking, and on other factors such as the observed signal-to-noise ratio.

Provision is also made to weight superposed communication information according to instantaneous signal angle of arrival, in the same way that bearing information is weighted.

When bearing angle changes can occur in less than the system averaging times, corresponding lags in indication may be expected. This invention provides for compensatory measures by stabilization of sensor platform angles or of the sensed output data.

In the immediate vicinity of a source of radiated waves, increased angular rates of bearing change result from the polar geometry; since signal strength tends to increase simultaneously, provision is made to adjust the angle follow-up rates accordingly.

The principles of the invention are illustrated by the accompanying drawings:

FIG. 1 is a block diagram of an embodiment in which the phases in two channels derived from two sensor outputs are compared.

FIG. 2 is a block diagram of an embodiment in which the amplitudes in two channels derived from the sum and difference of the outputs of two sensors are compared.

Figure 3:
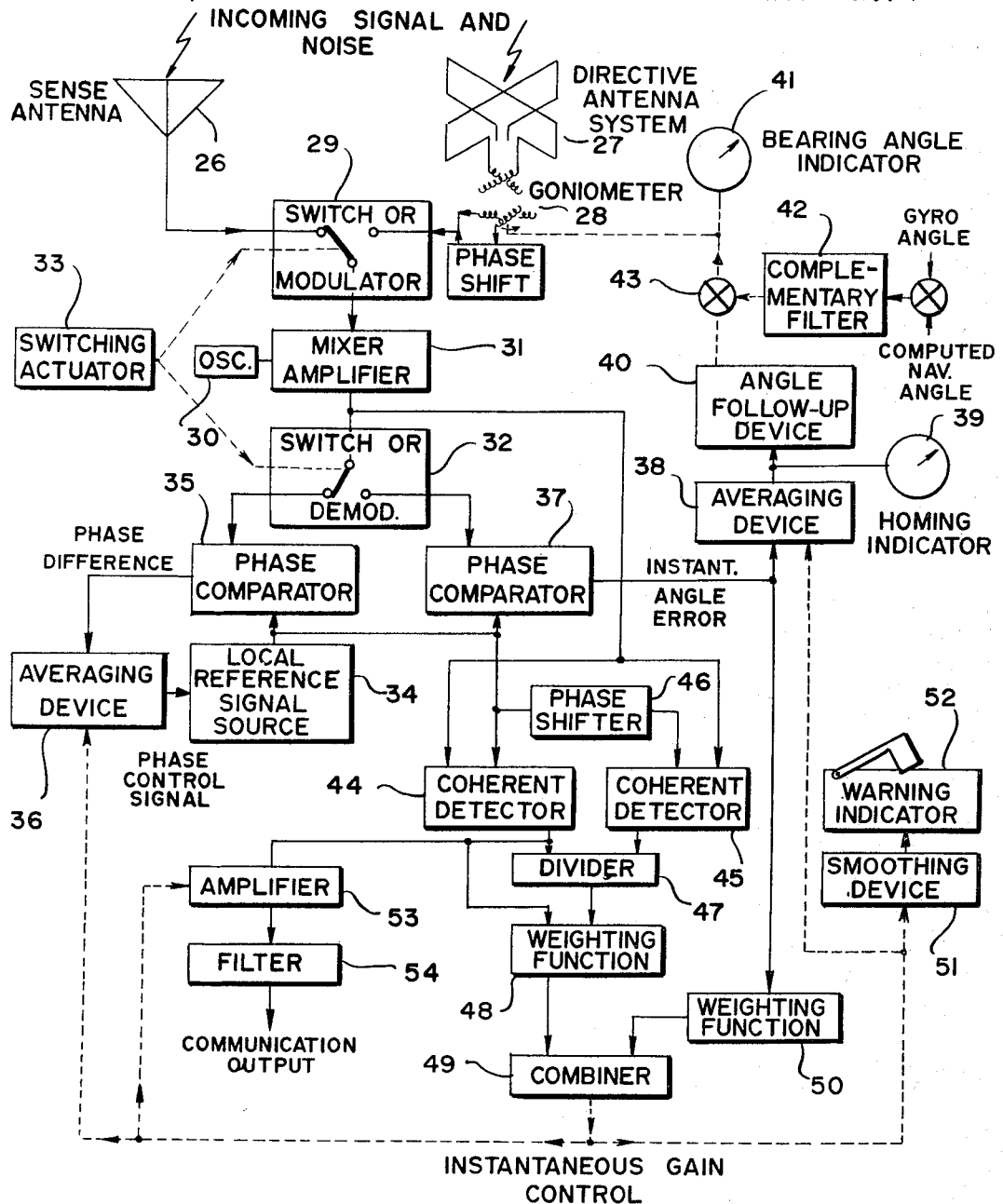
FIG. 3 is a block diagram of a particular form of the embodiment in FIG. 1, illustrating the application of synchronously switched components in a shared channel, angle stabilization, instantaneous control of system parameters with reference to signal, noise, and angle fluctuations, and warning indication.

The diagrams are illustrative rather than all-inclusive, and alternative implementations are clearly possible. For instance, in FIGS. 3 and 4, the time-shared switched channels could be replaced by two or more separate channels; other antenna types could be substituted, other phase reference quantities varied, etc.

In FIG. 1, the received waves are sensed by sensor 1 and sensor 2, which may be antennas, antenna systems, Hall-effect probes, or other sensing means, subject to the basic requirement that their directive phase responses be different with respect to bearing angle of sensed waves. A local reference signal, from 3, of the same form as all or part of the desired signal to be received, is generated, and compared in phase comparator 4, with the output of sensor 1; a quantity related to phase difference is extracted, averaged over a time interval in averaging device 5, and fed back to local reference signal source 3, to lock the phase of the local signal relative to the received signal. The loop formed by 3, 4, and 5, is typical of phase-lock circuitry; the local reference signal source 3, could typically be a voltage-controlled oscillator or voltage-controlled variable-speed magnetic tape recorded signal source; phase comparator 4, could be a quadrature phase-shifter and ring-modulator multiplier, giving a product of orthogonal quantities averaging to zero for in-phase inputs; and averaging device 5, could typically be an integrator.

The phase of the local reference signal source 3, output is compared with the phase of the output of sensor 2, in phase comparator 6, which may be of the same type as 4; the output of 6 is averaged to attenuate random effects, and supplied to homing indicator 8, which indicates the direction to turn for null or a given phase difference between the outputs of 2 and 3, as averaged by 7. The output of averaging device 7, is also supplied as the error signal to angle follow-up device 9, a servo element which rotates sensor 2, or a component which shifts the phase of the processed output of 2; the amount of angular rotation that nulls the error signal is displayed on bearing angle indicator 10. The time interval of the averaging is selected to be long in comparison with the mean length of noise bursts, but to be sufficiently short to permit an acceptable rate of indication (e.g., time required for response of the indicating or control circuits to the desired incoming signal) as to bearing angle or homing information.

If sensor 1, is a nondirectional sense antenna, the advantage of a relatively strong synchronizing signal source whose phase is unaffected by rotation exists; 1 may alternatively be directive, permitting increased phase sensitivity as a function of angle, but with ambiguity problems, and the need for dynamic compensation of the local reference signal phase during turns.

Sensor 2 may be a loop, in which case the phase shift either leads or lags the input in quadrature, changing abruptly at broadside angles, where the sinusoidal amplitude pattern has its nulls. If sensor 2 consists of two loops in both geometric and phase quadrature connection, a constant amplitude pattern is obtained with continuously varying phase shift numerically equal to bearing shift; if phase comparator 6, is a phase meter, its output can be made to indicate bearing directly; if sensor 1 consists of the same two loops connected in opposite phase rotation, rather than a nondirectional antenna, the phase difference between the outputs of sensors 1 and 2 will change at twice the bearing shift rate, providing higher sensitivity of output angle indication at the cost of ambiguity and susceptibility to synchronization error in turns; the ambiguity may be intermittently resolved by substitution of a sense antenna in 1, and the susceptibility may be reduced by inserting externally-derived heading and navigational angle changes as corrections.

Similar considerations apply to the use of loops and a rotatable goniometer coil output in lieu of a rotatable loop, or Adcock elements in view of a loop. Alternatively combinations of directive antennas may be used to produce amplitude nulls in certain directions, using techniques known in the art.

In FIG. 2, the received waves are sensed by sensors 11 and 12, whose directive responses must be different. A phase shifter 13 brings the output of 12 into proper relationship for summing and differencing in 14 and 15 respectively; if 11 is a non-directive sense antenna and 12 is a loop antenna, with quadrature phase shift in 13, and with appropriate gain functions, the outputs of 14 and 15 will have amplitude responses with respect to bearing angle having the shapes of intersecting cardioids as in conventional automatic direction finders. A local reference signal from 16, of the same form as all or part of the signal to be received, is generated, and compared with the output of 14 in phase comparator 17, whose output is averaged in 18 and is caused to lock the phase of 16 to that of the processed signal. The two cardioid pattern channels 14 and 15 outputs are detected coherently with respect to the phase-locked local reference signal output of 16 in phase-coherent detectors 19 and 20, which may be balanced multipliers. The detector outputs are compared in amplitude comparator 21, which may be a subtraction circuit, whose output is average in averaging device 22, whose output actuates homing indicator 23. If the phase of the incoming signal were to reverse relative to 16, it may be seen that the output of amplitude comparator 21 would reverse in polarity; since noise inputs and heterodyning signals involve reversals in phase, the effect of averaging device 22 tends to average out their contributions to the angle error signal while preserving the coherent contribution of the desired signal. The averaged angle error signal from 22 is supplied to angle follow-up device 24, a servo element which rotates sensor 12; the amount of angular rotation that nulls the error signal is displayed on bearing angle indicator 25.

In FIG. 3, the received waves are sensed by a non-directional sense antenna 26, and a directive antenna system 27, which is connected to a goniometer 28 in such a way that rotation of the moving coils changes the output phase by the angular amount of the rotation. The switch or modulator 29 alternately selects the output of 26 and 28. An oscillator 30 produces a signal which is mixed with the output of 29 in mixer amplifier 31, whose output is at an arbitrary intermediate frequency. This output is switched or demodulated in 32 at the same switching rate as in 29, under control of switching actuator 33, which may operate at an arbitrary systematic or random rate; the effect is to time-share a single set of components between two channels, as is common in the present art. A local reference signal of the expected form of received signal components is generated in 34, whose output is compared with the sense channel output of 32 in phase comparator 35, the phase difference being averaged in 36, whose output phase-locks 34 relative to the incoming signal. The local reference signal output of 34 is also compared with the directive channel output of 32 in phase comparator 37, whose output is averaged in 38 and displayed on holding indicator 39. The output of 38 also actuates the servo angle follow-up device 40, which rotates the goniometer coils of 28 to maintain a null or reference output of 38, the bearing angle corresponding to the rotation being displayed by 41. This indication is dynamically augmented with respect to system translations and rotations by adding through complementary filter 42, and adder 43, processed external navigation and gyro angle information. In addition, signal-to-noise ratio is derived for adjustment of system parameters, by comparing the quadrature component of the processed signal with the in-phase component, as referred to the local reference phase. The output of 31 is coherently detected with respect to the output of 34 in coherent detector 44, which may be a multiplier; a similar process takes place in 45, except that the phase shifter 46 has shifted the reference signal into quadrature. The output of divider 47 is substantially indicative of short-term signal-to-noise ratio. The weighting function 48, which may consist of digital logic elements, delivers two or more output levels, depending on whether the signal level from 44 and the signal-to-noise ratio from 47 meet preset criteria; the output level information goes to combiner 49; also supplied to 49 is the output of weighting function 50, which delivers two or more output levels, depending on whether the instantaneous angle error signal from 37 meets preset criteria. The output of 49 adjusts the gain of 36, thereby changing the synchronization rate of the local reference signal; the gain of 38, thereby changing the bearing angle indication response; and the input to 51, whose output actuates warning indicator 52, when the bearing becomes unreliable. Also the comunication content in the output of 44, which is fed through amplifier 53, is noise-limited therein according to the output of 49, and processed through a low-pass filter 54.

Figure 4:
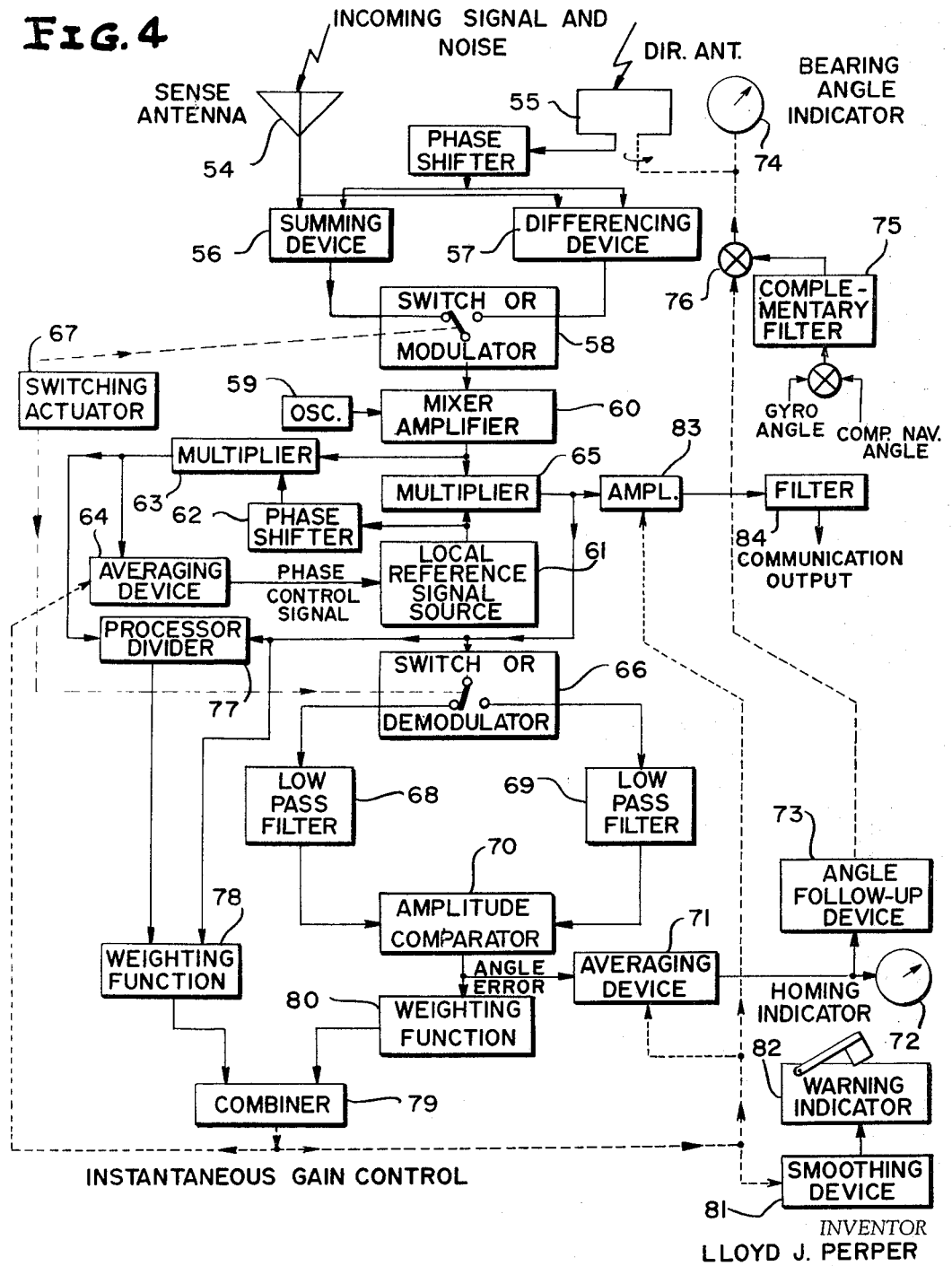
FIG. 4 is a block diagram of a particular form of the embodiment in FIG. 2, illustrating the application of principles analogous to those applied in FIG. 3.

In FIG. 4, the received waves are sensed by a nondirectional sense antenna 54, and a directive antenna 55, the former being shown as a top-loaded vertical antenna and the latter as a rotatable loop with phase shifter to permit in-phase summing and differencing in 56 and 57 respectively, whose outputs are commutated into a time-shared channel by switch or modulator 58. An oscillator 59, whose output mixes with the output of 58 in mixer amplifier 60, causes a shift to an arbitrary intermediate frequency. A local reference signal source is phase-locked to the output of 60 by the closed loop including the source itself, 61, quadrature phase shifter 62, multiplier 63, and averaging device 64, which may be an integrator The ououts of 60 and 61 are coherently multiplied in 65, whose output is supplied to 66 for decommutation, as controlled by switching actuator 67. The two outputs of 66, corresponding to alternately sampled cardioid-type pattern responses, are fed through low pass filters 68 and 69 for short-term memory to permit simultaneous comparison in 70, which may be a subtractor. The output angle error quantity is averaged in 71 and displayed on homng indicator 72. The output of 71 is also fed to servo angle follow-up device 73, which causes the loop 55, to rotate for null or a reference output of 71, the angle of the loop being displayed by bearing angle indicator, 74. The bearing indication is dynamically supplemented by gyro angle and computed navigation angle information from external measurements, processed through complementary filter 75, and adder 76. The outputs of 65 and 63 are stored for simultaneous comparison and divided in processor-divider 77, whose output along with that of 65 serve as inputs to weighting function 78; 78, which may consist of digital logic elements, delivers two or more output levels, the instantaneous level depending on whether the signal level from 65 and the signal-to-noise ratio from 77 meet preset criteria. The output of 78 is fed to combiner 79. Also supplied to 79 is the output of weighting function 80, which delivers two or more output levels, the instantaneous level depending on whether the instantaneous angle error signal from 70 meets preset criteria. The output of 79 adjusts the gain of 64, thereby changing the synchronization rate of the local reference signal; the gain of 71, thereby changing the bearing angle indication response; and the input to 81, whose output actuates warning indicator 82, when the bearing becomes unreliable. Also the communication content in the output of 65, which is fed through amplifier 83, is noise-limited therein according to the output of 79, and processed through low-pass filter 84.

What is claimed is:

1. A direction finding system for determining direction of arrival of incoming electromagnetic radiation of at least partly anticipated form in the presence of spurious and interfering perturbations, comprising a pair of sensing means of different directive response characteristics for deriving from the incoming radiation a respective pair of signals representative thereof, means for locally generating a reference signal having a form at least approximating the anticipated form of the desired incoming radiation, means responsive to at least one of said derived signals for maintaining said reference signal in phase synchronous relationship therewith, means responsive to at least the other of said derived signals for synchronous detection of a parameter thereof relative to the phase-synchronized reference signal, and means for extracting, from the synchronously detected parameter, information relating to direction of arrival of said desired incoming radiation.

2. The invention according to claim 1 wherein said means for maintaining phase synchronous relationship comprises a phase-lock loop including means for comparing the phases of said reference signal and one of the derived signals, and for developing from the comparison a signal representative of the phase difference therebetween, and means for averaging said developed signal over a relatively long time interval compared with mean length of said perturbations.

3. The invention according to claim 2 wherein said synchronously detected parameter is relative amplitude, the amplitudes of said derived signals being functions of direction of arrival of the incoming radiation from which they are derived, and wherein said synchronous detection is coherently performed on at least one of the sum and difference of said derived signals relative to said phase synchronized local reference signal;

said means for extracting information including means for averaging detected amplitude over a relatively long time interval compared with the mean length of said perturbations to produce a time-averaged amplitude signal; and means responsive to the time-averaged amplitude signal for indicating the direction of arrival of the incoming radiation.

4. The invention according to claim 3 wherein said coherent detection is performed on both the sum and difference of said derived signals, and wherein said means for extracting information further includes means responsive to the detected amplitudes of the sum and difference signals for comparison thereof to produce a signal representative of the difference between the detected amplitudes, means for applying said detected amplitude difference-representative signal to said averaging means of the means for extracting information.

5. The invention according to claim 4 wherein said means for extracting information further includes means further responsive to said time-averaged amplitude signal for varying the input to said coherent detection means from one of said sensing means to null said relative amplitude difference.

6. The invention according to claim 5 wherein each of said sensing means comprises an antenna system, one of said antenna systems being directive in response, and wherein said means for varying the input to said coherent detection means comprises means for varying the effective orientation of said directive antenna system relative to the direction of said incoming radiation.

7. The invention according to claim 2 wherein said synchronously detected parameter is relative phase, said synchronous detection means producing a signal representative of relative phase difference, and wherein said means for extracting information includes means for averaging the relative phase difference-representative signal over a relatively long time interval compared with the mean length of said perturbations.

8. The invention according to claim 7 wherein said means for extracting information further includes means responsive to said time-averaged relative phase difference-representative signal for indicating angle of arrival of said incoming radiation, said time interval over which said relative phase difference-representative signal is averaged selected to be sufficiently short to provide an acceptable rate of indication by said indicating means in response to the incoming radiation.

9. The invention according to claim 8 wherein said means for extracting information further includes means responsive to said time-averaged relative phase difference-representative signal for varying the input to said synchronous detection means from one of said sensing means to null said relative phase difference.

10. The invention according to claim 9 wherein said means for varying the input to said synchronous detection means comprises means for shifting the phase of the signal derived from the last-named one of said sensing means in accordance with said relative phase difference.

11. The invention according to claim 9 wherein each of said sensing means comprises an antenna system.

12. The invention according to claim 11 wherein one of said sensing means comprises a substantially non-directional antenna system, and wherein is further provided means for supplying signal derived by said non-directional antenna system to said means for maintaining synchronous phase relationship, and wherein the other of said sensing means comprises a directive antenna system, and wherein is further provided means for supplying signal derived by said directive antenna system to said synchronous detection means, and wherein said means for varying the input to said synchronous detection means comprises means for changing the effective orientation of said directive antenna system relative to the direction of said incoming radiation.

13. In a direction finding system for detecting angle of arrival of incoming electromagnetic waves of at least partially known form in the presence of noise, the combination comprising first and second sensing means having distinct and different direction responses to said incoming waves for deriving therefrom respective signals representative thereof;

means for generating local reference signal of said known form;

means responsive to said local reference signal and to signal deriving from at least one of said sensing means for synchronizing the phase thereof, including time averaging means responsive to phase difference between said signals to which said phase synchronizing means is responsive to cancel accompanying noise and thereby prevent loss of synchronization;

means responsive to the phase-synchronized reference signal and to signal deriving from at least one of said sensing means for cross-correlation thereof to develop a signal proportional to instantaneous error between actual angle of arrival of said incoming waves and angle of arrival thereof as detected by said system; and time averaging means responsive to said error signal for cancelling effects of noise therefrom to produce a signal suitable for driving said error signal to a predetermined reference condition.

14. The combination of claim 13 wherein said first sensing means comprises a non-directional antenna system, and wherein said second sensing means comprises a directive antenna system, said phase-synchronizing means responsive to signal deriving from said first sensing means, and said cross-correlating means responsive to signal deriving from said second sensing means.

15. The combination of claim 13 further including means responsive to the time-averaged error signal for indicating angle of arrival of said incoming waves.

16. The combination of claim 15 wherein said direction finding system is located within a vehicle having means for supplying angular orientation and navigation information for vehicle rotation and translation, and wherein said combination in said direction finding system further includes means responsive to said angular orientation and navigation information for cancelling the effects of vehicular speed and orientation relative to the sources of said incoming waves on said error signal.

17. The combination of claim 13 wherein is provided means responsive to the time-averaged error signal for progressively varying said derived signal to which said cross-correlation means is responsive, to null said error signal.

18. The combination of claim 17 wherein said progressively varying means comprises means for changing the effective orientation of one of said sensing means to produce said nulling of said error signal.

19. The combination of claim 17 wherein is further included weighting means responsive to said error signal for reducing the responsivity of said progressively varying means when said error signal undergoes change exceeding a predetermined value within a preset time interval, indicative of fluctuations attributable to sources other than the desired incoming waves.

20. The combination of claim 19 wherein is further included means for producing a warning signal indicative of unreliability of angular information, in response to said error signal change exceeding said predetermined value.

21. The combination of claim 19 wherein is included further weighting means responsive to signal deriving from both said sensing means for weighting the gain of derived signal in accordance with changes in value of said error signal so as to discriminate against energy received by said sensing means during intervals when error signal fluctuations exceed expected limits.

(References on following page)

References Cited

UNITED STATES PATENTS

| | | | |
|---|---|---|---|
| 1,839,290 | 1/1932 | Bailey | 343—123 |
| 2,299,083 | 10/1942 | Elm | 343—112 |
| 2,478,734 | 8/1949 | Abraham | 343—108 |
| 2,718,638 | 9/1955 | De Rosa et al. | 343—113 |
| 2,853,705 | 9/1958 | Marchand | 343—113 |
| 3,028,600 | 4/1962 | Bailey | 343—113 |
| 3,131,393 | 4/1964 | Oppedahl | 343—114 |
| 3,194,949 | 7/1965 | Jasperson. | |
| 3,199,106 | 8/1965 | Karr. | |
| 3,204,241 | 8/1965 | Bjorkman | 343—112 |

RODNEY D. BENNETT, *Primary Examiner.*

CHESTER L. JUSTUS, *Examiner.*

D. C. KAUFMAN, *Assistant Examiner.*